Dec. 7, 1943.  L. L. HARMON  2,336,245
WINDBACK DEVICE
Filed Aug. 4, 1940
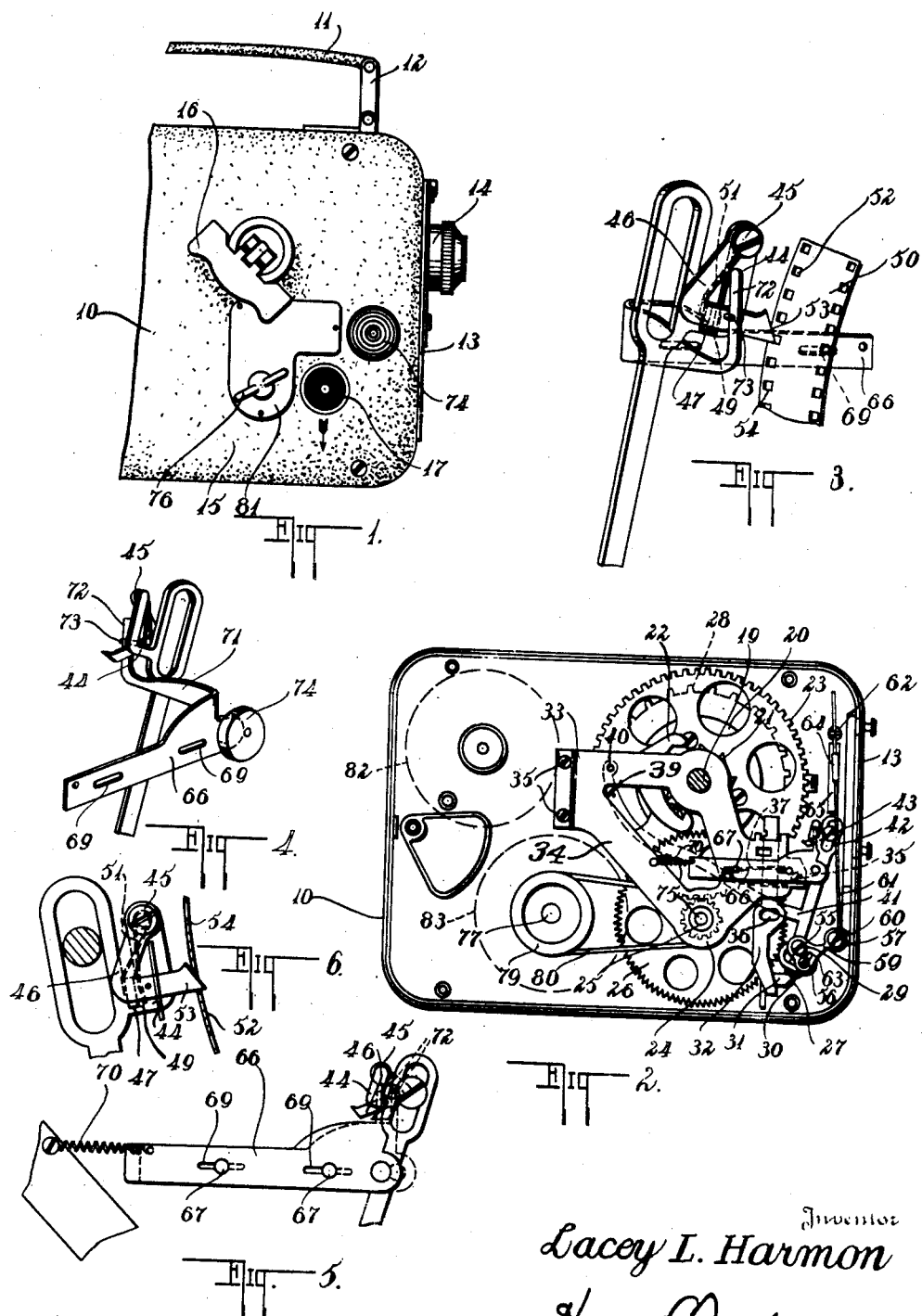
Inventor
Lacey L. Harmon
By Howard L. Fischer
Attorney Patented Dec. 7, 1943

2,336,245

UNITED STATES PATENT OFFICE 2,336,245

WINDBACK DEVICE

Lacey L. Harmon, St. Paul, Minn., assignor to John A. Stees, II, St. Paul, Minn.

Application August 4, 1940, Serial No. 351,323

10 Claims. (Cl. 88—18.4)

My invention relates to an improvement in windback devices wherein it is desired to provide a device for use on motion picture apparatus for winding the film back upon the supply roll to produce certain photographic effects.

It is sometimes desired to provide a means of winding the film back upon the supply roll after exposure or partial exposure thereof in order to make lap dissolves, superimposed pictures, action titles, and other unusual effects. A lap dissolve is made by fading out one scene by means of a fading device or by other suitable means, winding back the film to the start of the fade out, and fading in the next scene. By this means the scene is gradually made to fade from one scene to another without any definite break between the scenes. Superimposed pictures may be made either by making a double exposure of a section of film, or by masking a portion of the film in its travel past the lens, and then rewinding the film and leaving the previously masked film portion unmasked while masking the previously exposed portion thereof. Action titles may be made by taking an action picture, winding the film back, and taking a picture of a title, this title thus being superimposed upon the action picture. All of these special effects as well as other unusual effects, require that the film be wound partially back upon the supply roll so that it may again be exposed.

Most motion picture cameras in common use include a film moving mechanism which is not reversible in action. In other words the film is drawn in one direction by the film moving mechanism. An attempt to wind the film in the opposite direction results in the tearing of the film by the film moving mechanism during the reverse movement thereof. This is particularly true of the common pull-down type of film moving mechanism, which is usually equipped with a pull-down claw which is not reversible in action.

It is the object of the present invention to provide a windback mechanism which may either be manufactured as a part of the original camera, or which may be easily and quickly added to a camera previously manufactured. This mechanism is extremely simple in its operation, and acts to hold the pull-down claw used for moving the film out of contact with the film during the reverse movement of the film to prevent injury thereto during the windback operation.

It is a purpose of my invention to provide an additional film winding key which may be operated to rotate the film spools and driving mechanism in a reverse direction, and a finger which may engage the pull-down claw to prevent engagement of this claw with the film during the reverse movement thereof. Thus, by merely operating the finger to disengage the claw from the film, covering the lens opening, and winding the film driving mechanism rearwardly, the film may be rewound upon the supply roll for a second exposure or second partial exposure.

It is a purpose of my invention to provide a windback device which does not affect the operation of any of the working parts of the camera; all of the mechanism of the camera working normally with the exception that the claw is held away from the film. Thus no clutches are required, and all of the elements remain in timed relationship throughout the rewinding operation. Even the lens shutter operates in the usual manner, exposure of the film during the windback operation being prevented by closing the lens opening in some simple manner, as by placing the thumb over the lens barrel.

These and other objects and novel features of my invention will be more clearly and fully set forth in the following specification and claims.

In the drawing forming a part of my specification:

Figure 1 is a side elevation view of a portion of the outer housing or casing of a camera embodying my windback device.

Figure 2 is a side elevation view of the camera with one side removed showing the gearing connecting the power drive of a typical camera to the pull-down mechanism and shutter, showing my windback device attached thereto.

Figure 3 is a perspective view of a fragmentary detail showing the pull-down claw, its connection with its supporting arm, and the claw release mechanism for holding the claw out of engagement with the film.

Figure 4 is a perspective view of the mechanism illustrated in Figure 3, the view being taken from the opposite side of the mechanism.

Figure 5 is a side elevation view of the mechanism illustrated in Figure 3, the view being taken from the same position as Figure 2, and showing the claw release in inoperative position, the operative position being indicated by dotted outline.

Figure 6 is a side elevation detail view of the film moving claw mechanism.

My windback device is shown applied to a camera such as that shown in Patent 2,011,342, issued August 13, 1935, to Joseph Mihalyi. It should be understood that my device can be added to other forms of cameras, most of the structure of the camera not being important to the present invention.

The camera illustrated embodies a housing 10 which may be provided with a handle 11 connected to the housing by links 12. The links 12 may form spaced finders for the camera. The housing 10 includes a front wall 13, upon which is mounted the usual type of objective mounted in a lens barrel 14. The side 15 of the housing supports a spring motor winding key 16, and the motor release button 17 extends through this side wall 15 so that the motor may be released to move the film past the lens opening.

As best seen in Figure 2 of the drawing, the winding key 16 is secured to the shaft 19 which, when rotated, winds a spring motor 20. A ratchet wheel 21 and a pawl 22 are employed to retain the spring motor 20 against rearward movement during winding. A gear 23 is secured to the spring motor 20 for rotation thereby, this gear being turned by the spring of the motor 20. A pinion 24 is in mesh with the gear 23, and acts to rotate a shaft 25 bearing the large gear 26. The gear 26 in turn meshes with a pinion 27 carrying an eccentric stud 29. A concentric film driving drum 28 is also driven by the spring motor 20.

An eccentric lug 30 is mounted on the pinion 27; and is engageable with a latch member 31 mounted on a slide 32. The slide 32 is slidably mounted upon a bridge bracket 33 on the mechanism plate 34 of the camera, which bracket is secured by screws 35 to the plate 34. The slide 32 is provided with an opening 36 which is engaged by a post extending inwardly from the push button 17. By sliding the release button 17 downwardly in the direction of the arrow in Figure 1, the slide 32 is moved downwardly, moving the latch member 31 out of engagement with the eccentric lug 30. When the latch 31 is disengaged from the lug 30, the spring motor 20 will drive the mechanism. To stop the camera, the push button 17 is released, the spring 37 sliding the slide 32 upwardly and allowing the latch 31 to engage the eccentric lug 30.

The shutter mechanism consists in an L-shaped lever 39 which is pivoted at 40 to the mechanism plate 34. An end 41 of the lever 39 is slotted at 42 so that it may slide freely upon a pin 43. The pivot point 40 is substantially on the radius of the lens aperture. It may thus be seen that the end 41 of the lever 39 which slides about the pin 43 follows the curve of the film gate. This end 41 carries a portion 44 which is bent to pass through the mechanism plate 34; and this portion 44 carries a stud 45 on which the pull-down mechanism or claw is mounted, as designated by the numeral 46. The claw 46 carries a lug 47 adapted to strike the abutment 49 to limit its movement toward the film 50 under the impulse of the spring 51. The spring 50 always tends to hold the claw 46 in engagement with the film. The claw 46 is wider than the width of the film apertures 52, so that the claw cannot pass through the aperture, the end of the claw always engaging one side of the film.

In the downward movement of the claw, this claw end 53 engages the lower edge 54 of the film apertures 52, moving the film 50 downwardly as the lever 39 is moved. During the upward movement of the lever 39 the claw moves against the action of the spring 51 and rides over the back surface of the film 50.

The lever 39 is oscillated by the eccentric stud 29 which passes through a slot 55 in the lever 39. This slot may be shaped to provide a non-uniform movement of the lever, and to move the claw 46 downwardly more quickly than it moves upwardly, and so that the film remains stationary for a greater length of time.

The movement of the film shutter is coordinated with the movement of the film. A stud 56 is mounted on the lever 39. A lever 57 is pivoted on the stud 56; and has an arm 59 terminating in a pivot 60 to which there is attached a slidable rod 61. The rod 61 is mounted to slide freely in a bearing 62 at its upper end and the lever 57 is provided with a cam slot 63 by which the lever is oscillated to operate the shutter plate 64 which is attached to the rod 61 and which may move freely through a slot 65 in the mechanism plate 34.

The slot 63 in the lever 57 is a straight slot and it engages the eccentric stud 29 which also moves the cam operating the pull-down mechanism. Thus the shuter operating lever 57 is pivoted to the pull-down carrying lever and is operated by the same eccentric stud. This makes is unnecessary to adjust the shutter to operate in timed relation with the claw 46. Pivoting the lever 57 to the lever 39 has the effect of uncovering the exposure during the time the film remains stationary.

I provide a slide 66 attached to the bridge bracket 33 by screws or rivets 67 which engage in slots 69 in the slide 66. A spring 70 holds the slide 66 normally at one extremity of its movement, and is attached to one end of the slide 66 and to the bridge bracket 33. The other end of the slide 66 is provided with a transversely extending arm 71 which extends through the mechanism plate 34 and is provided with an upwardly extending end 72, as best seen in Figures 3, 4 and 6 of the drawing.

A stop pin 73 projects laterally from the claw 46. This pin 73 is normally spaced forwardly from the upwardly extending end 72 of the claw 46. However, when the slide 66 is moved forwardly, against the tension of the spring 70, this end 72 engages the pin 73 on the claw 46 and pivots the claw about its pivot 45, flexing the spring 51. As long as the slide 66 is in its forward position, the end 72 engages the pin 73 and holds the claw out of engagement with the film. The claw will be reciprocated or oscillated by the lever 39, but will remain out of contact with the film, and thus will not prevent the film from being wound in a reverse direction.

In order to operate the slide 66, I provide an operating button 74 which is secured to the slide 66 and which extends through the side wall 15 of the housing 10. The button 74 extends through a slot in the wall 15; and by pressing the button 74 forwardly, the slide 66 may be moved forwardly to bring the upwardly projecting end 72 of the same into engagement with the pin 73 on the claw 46, disengaging the claw from the film 50.

In order to rotate the film in a reverse direction, I drill and tap a hole in the shaft 25. Into this tapped hole, I thread a square shank 75 which projects through the wall 15 of the housing 10. A key or crank 76 may be engaged upon the shank 75 by means of which the shaft 25, and the rest of the associated mechanism, may be operated. Thus the film spools, indicated by the numerals 82 and 83, and the film driving drum 28 may be operated in a reverse direction. One of the film spools is mounted on the shaft 77 bearing the pulley 79. The pulley 79 is operated from a pulley on shaft 25 by means of a suitable belt 80.

In order to operate the windback device, it is only necessary to cover the lens barrel 14, to insert a key or crank 76 on the shank 75, and to press the button 74 forwardly. By rotating the key or crank 76, the mechanism may be operated in a reverse direction to wind film back on the supply roll while the claw 40 is held out of operative position by the upwardly extending end 72 of the slide 66. An L-shaped plate 81 on the outer surface of the side 16 of the housing 10 forms a decorative bearing plate and name plate through which the shank 75 extends.

In accordance with the patent statutes, I have described the principles of construction and operation of my windback device, and while I have endeavored to set forth the best embodiment thereof, I desire to have it understood that obvious changes may be made within the scope of the following claims without departing from the spirit of my invention.

I claim:

1. A windback device for motion picture apparatus comprising a pair of film spools, a constantly operable film driving means engaging the film between said film spools, a pull-down claw engaging the apertures in the film to move the same downwardly, a spring urging said claw into engagement with said film, means engaging said claw to hold said claw out of engagement with said film, and auxiliary means for moving said film upwardly in a reverse direction while said claw is out of engagement with said film.

2. A windback device for motion picture apparatus comprising a pair of film spools, a constantly operable film driving means operable in a forward direction only engaging the film at spaced points between said spools, a pull-down claw engaging said film between said spaced points, spring means holding said pull-down claw in engagement with said film, means engageable with said pull-down claw to hold said claw out of contact with the film, and auxiliary means engaging said film driving means for moving said film in a reverse direction while said claw is out of contact with the film.

3. A windback device for motion picture apparatus comprising a pair of film spools, a constantly operable film driving means operable in a forward direction only engaging the film at spaced points between said spools, a pull-down claw engaging the film between said spaced points, means connecting said film driving means and said pull-down claw to reciprocate the claw during operation of the film driving means, means engaging said claw to hold the same out of engagement with the film during reciprocation thereof, and auxiliary means engaging said film driving means to move the film in a reverse direction while said claw is out of engagement with the film.

4. In combination with a camera having an objective and means for guiding a film past said objective, a claw for engaging the film to move the same in one direction, an oscillating lever supporting the claw to oscillate the same, and a spring urging the claw into engagement with the film; a slidably supported means movable between an operative and an inoperative position, said slidably supported means operable in operative position to engage said claw and hold the same out of engagement with the film during oscillation thereof and independently operable means for moving said film in either direction.

5. In combination with a camera having an objective and means for guiding a film past said objective, a claw for engaging the film to move the same in one direction, an oscillating lever supporting the claw to oscillate the same, and a spring urging the claw into engagement with the film; a slidably supported means movable between an operative position and an inoperative position, said slidably supported means operable in operative position to engage said claw and hold the same out of engagement with the film, and means for moving the film in a reverse direction.

6. In combination with a camera having an objective and means for guiding a film past said objective, a claw for engaging the film to move the same in one direction, an oscillating lever supporting said claw to oscillate the same, and a spring urging said claw into engagement with the film; a means continuously engageable with said claw during oscillation thereof to hold said claw out of engagement with said film throughout the longitudinal movement of said claw, and means for moving the film in the opposite direction.

7. In combination with a camera having an objective and means for guiding a film past said objective, a claw for engaging the film to move the same in one direction, means for moving said claw longitudinally of said film, and a spring urging said claw into engagement with said film; a means engageable with said claw during longitudinal movement thereof to hold said claw out of engagement with said film throughout the longitudinal movement of said claw, and means for moving said film in the opposite direction.

8. A windback device for motion picture apparatus comprising a pair of film spools, a film extending therebetween, a claw engaging said film, means reciprocating said claw to move the film in one direction, means engageable with said claw during reciprocation thereof to hold the claw out of engagement with the film during this reciprocation, and auxiliary means engaging said film for moving said film in a reverse direction while said claw is out of contact with the film.

9. In a motion picture having an objective, a pull-down mechanism for the film including a film engaging claw and an oscillating lever carrying said claw, a normally inoperative means engageable with the claw, said normally inoperative means holding said claw constantly out of engagement with the film during oscillation of said lever, and auxiliary means engaging said film for moving said film in a reverse direction while said claw is out of contact with the film.

10. In combination with a camera having an objective and means for guiding a film past said objective, a claw for engaging the film to move the same in one direction, an oscillating lever supporting said claw to oscillate the claw, and a spring urging the claw into engagement with the film; a means engageable with the claw during oscillation thereof to hold the claw constantly out of engagement with the film, and auxiliary means engaging said film for moving said film in a reverse direction while said claw is out of contact with the film.

LACEY L. HARMON.